(12) United States Patent
Hurley

(10) Patent No.: US 12,187,259 B2
(45) Date of Patent: Jan. 7, 2025

(54) BRAKING SYSTEM WITH REDUNDANT TRAILER COMMUNICATION

(71) Applicant: Bendix Commercial Vehicle Systems LLC, Avon, OH (US)

(72) Inventor: Ryan S. Hurley, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 373 days.

(21) Appl. No.: 17/752,433

(22) Filed: May 24, 2022

(65) Prior Publication Data

US 2023/0415716 A1  Dec. 28, 2023

(51) Int. Cl.
| | |
|---|---|
| *B60T 8/92* | (2006.01) |
| *B60T 7/12* | (2006.01) |
| *B60T 8/17* | (2006.01) |
| *B60T 17/22* | (2006.01) |

(52) U.S. Cl.
CPC ............... *B60T 8/92* (2013.01); *B60T 7/12* (2013.01); *B60T 8/1706* (2013.01); *B60T 17/22* (2013.01); *B60T 2270/10* (2013.01); *B60T 2270/402* (2013.01); *B60T 2270/406* (2013.01); *B60T 2270/413* (2013.01)

(58) Field of Classification Search
CPC .... B60T 13/662; B60T 17/22; B60T 2270/10; B60T 2270/402; B60T 2270/406; B60T 2270/413; B60T 7/12; B60T 8/1706; B60T 8/1708; B60T 8/885; B60T 8/92
See application file for complete search history.

(56) References Cited

U.S. PATENT DOCUMENTS

| | | | | |
|---|---|---|---|---|
| 11,891,038 B2* | 2/2024 | Goodarzi | ................ | B60T 8/172 |
| 2001/0030466 A1* | 10/2001 | Ehrlich | .................... | F16C 19/52 |
| | | | | 303/191 |
| 2004/0119334 A1* | 6/2004 | Lenz | ........................ | B60T 8/248 |
| | | | | 303/146 |
| 2005/0275281 A1* | 12/2005 | Prescott | ................ | B60T 8/1708 |
| | | | | 303/119.3 |
| 2010/0085172 A1* | 4/2010 | Ancuta | .................... | B60T 17/22 |
| | | | | 340/431 |

(Continued)

FOREIGN PATENT DOCUMENTS

EP      1541437 A2 *  6/2005   .............. B60T 8/321

OTHER PUBLICATIONS

Maryanka et al.; "Truck-Trailer Redundant Powerline CAN Communication"; SPARC Transactions YAM01; Aug. 2012; 4 pages.

*Primary Examiner* — Babar Sarwar

(74) *Attorney, Agent, or Firm* — Crowell & Moring LLP

(57) ABSTRACT

A braking system with redundant trailer communication is provided. In one embodiment, a braking control system for a tractor-trailer comprises a primary brake controller in a tractor configured to communicate with a trailer brake controller in a trailer via a first communication channel, and a redundant brake controller in the tractor configured to communicate with the trailer brake controller via a second communication channel. The primary brake controller is further configured to serve as a master brake controller for the trailer and communicate with an automated driving computer in the tractor. The redundant brake controller is further configured to take over as the master brake controller in response to determining that the primary brake controller can no longer serve as the master brake controller.

20 Claims, 4 Drawing Sheets

(56) References Cited

U.S. PATENT DOCUMENTS

| | | | | |
|---|---|---|---|---|
| 2015/0298669 | A1* | 10/2015 | Boer | B60T 8/1708 |
| | | | | 701/70 |
| 2018/0229786 | A1* | 8/2018 | Weaver | B62D 63/08 |
| 2021/0139008 | A1* | 5/2021 | DiGioacchino | B60T 8/1708 |
| 2021/0370922 | A1* | 12/2021 | Smith | B60W 40/10 |
| 2022/0297655 | A1* | 9/2022 | Dieckmann | B60T 13/683 |
| 2022/0340115 | A1* | 10/2022 | Knosmann | B60T 8/323 |
| 2022/0353655 | A1* | 11/2022 | Werle | B60W 50/0225 |
| 2023/0001898 | A1* | 1/2023 | Laine | B60T 8/1701 |
| 2023/0001904 | A1* | 1/2023 | Nemeth | B60T 13/26 |
| 2023/0415713 | A1* | 12/2023 | Van Thiel | B60T 7/20 |
| 2024/0051537 | A1* | 2/2024 | Brütt | B60W 30/181 |

\* cited by examiner

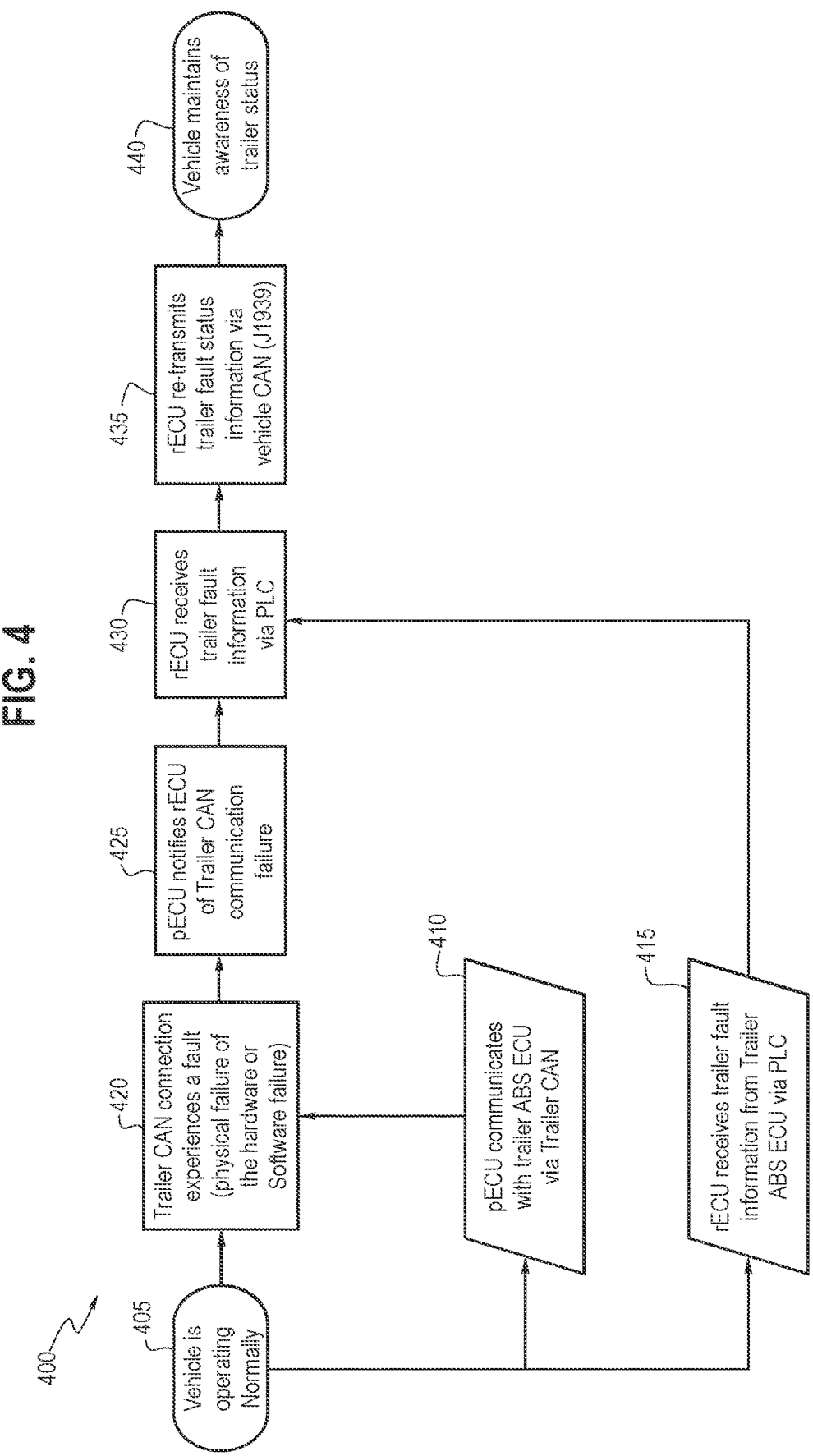

BRAKING SYSTEM WITH REDUNDANT TRAILER COMMUNICATION

BACKGROUND

Today's heavy-duty commercial vehicles configured for towing (a "tractor") are normally designed with two isolated braking circuits providing control of a steer axle (or steer axle group) and a rear axle (or rear axle group). Protected and isolated supply and control air signals can be provided from both circuits to a towed vehicle (a "trailer") to provide safe, stable stopping forces from all axles and wheel ends on both the tractor and the trailer. A brake controller in the trailer can communicate fault status to a brake controller in the tractor.

BRIEF DESCRIPTION OF THE DRAWINGS

FIG. 4 is a flow chart of a method of an embodiment for detecting a failure of a communication channel between a primary brake controller in a tractor and a trailer brake controller.

SUMMARY

The following embodiments generally relate to a braking system with redundant trailer communication. In one embodiment, a braking control system for a tractor-trailer is provided comprising a primary brake controller in a tractor configured to communicate with a trailer brake controller in a trailer via a first communication channel, and a redundant brake controller in the tractor configured to communicate with the trailer brake controller via a second communication channel. The primary brake controller is further configured to serve as a master brake controller for the trailer and communicate with an automated driving computer in the tractor. The redundant brake controller is further configured to take over as the master brake controller for the trailer in response to determining that the primary brake controller can no longer serve as the master brake controller for the trailer.

In another embodiment, a braking control system for a tractor-trailer is provided comprising: a primary electronic control unit in the tractor, wherein the primary electronic control unit comprises an electronic braking system (EBS) controller and is configured to communicate with a trailer brake controller in a trailer via a controller area network data link; and a redundant electronic control unit in the tractor, wherein the redundant electronic control unit comprises an anti-lock brake system (ABS) controller and is configured to communicate with the trailer brake controller via a power line communication interface. The redundant electronic control unit is further configured to take over from the primary electronic control unit as a braking controller for the trailer in response to a problem.

In yet another embodiment, a method is provided that is performed in a second brake control unit in a towing vehicle. The method comprises receiving heartbeat signals from a first brake control unit in the towing vehicle, wherein the first brake control unit in the towing vehicle is a master brake controller to a brake control unit in a towed vehicle; detecting a missing heartbeat signal from the first brake control unit; and in response to detecting the missing heartbeat signal, taking over as the master brake controller.

Other embodiments are possible, and each of the embodiments can be used alone or together in combination.

DETAILED DESCRIPTION

Figure 1:
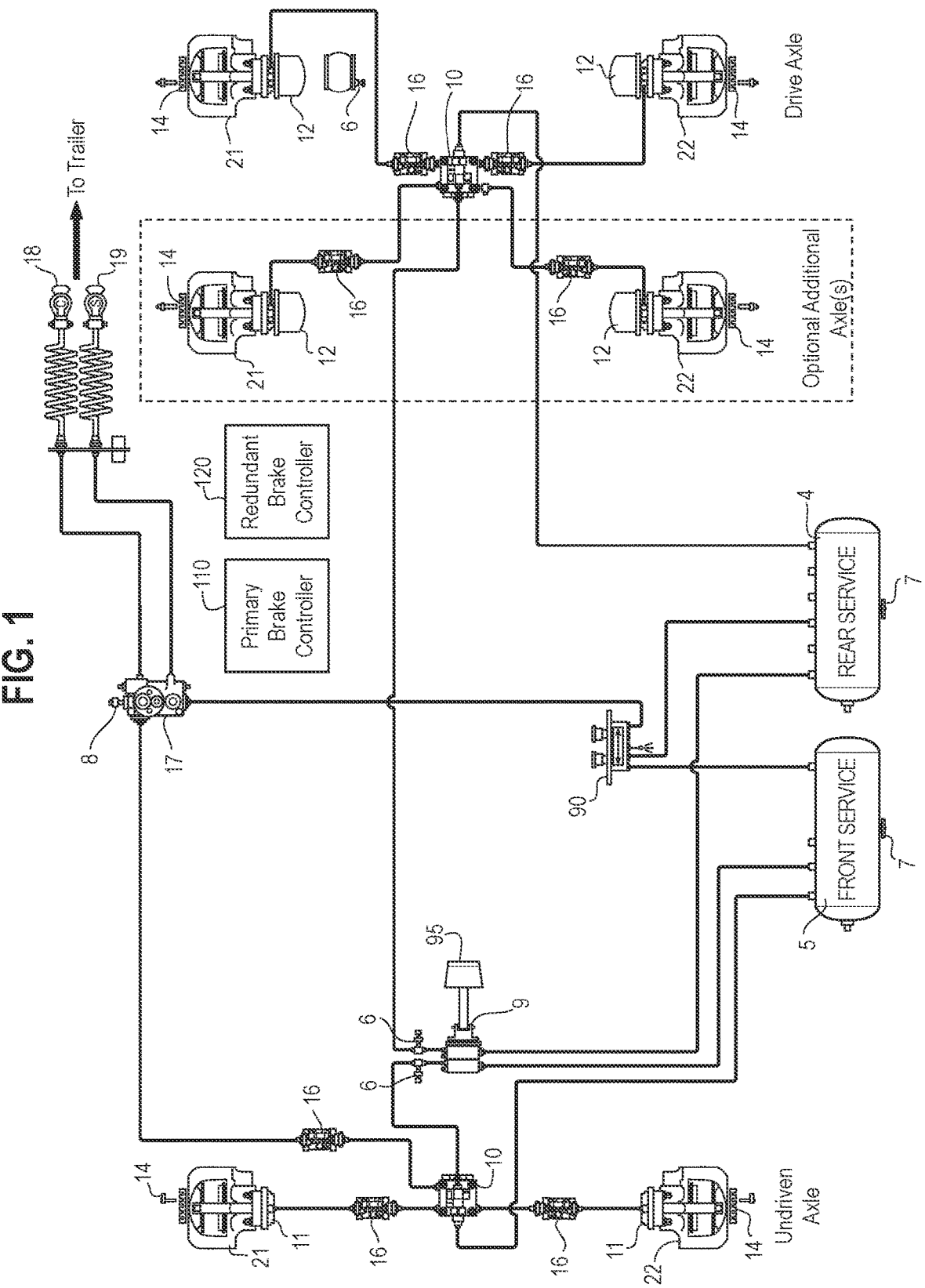
FIG. 1 is a diagram of a braking system of a tractor of an embodiment.

Turning now to the drawings, FIG. 1 is a diagram of a braking system of a tractor of an embodiment. As shown in FIG. 1, in this embodiment, the tractor has a rear drive axle, a front undriven (steer) axle (more than one steer axle can be used), and one or more optional axles (there can be zero additional axles, where the vehicle has a total of only two axles). The rear drive axle is driven by a drivetrain, which can include one or more of the following components: gas-powered motor(s), electric motor(s), batteries, transmission(s), differential(s), locking differential(s), and other such gear sets capable of changing rotational speeds. The number and location(s) of the motor(s) in the drivetrain can be selected in any suitable manner. For example, the tractor can have a single central motor coupled with the drive axle, a single motor per axle on a single axle or multiple driven axles in a rear axle group, a plurality of motors per axle on a single axle or multiple driven axles in the rear axle group, a single motor per axle on a single axle or multiple driven axles in a steer axle group, or a plurality of motors per axle on a single axle or multiple driven axles in the steer axle group. Other configurations are possible.

In some embodiments (e.g., those based on traditional anti-lock brake (ABS) systems), the driven, undriven, and optional axles can have various components that can be used to decelerate the tractor (in other embodiments (e.g., those based on electronic brake (EBS) systems), the relays and modulators on the rear axles can be combined into a single unit (an electro-pneumatic module (EPM)) that is capable of electronically applying, holding, and releasing air). As shown in FIG. 1, in this embodiment, the driven, undriven, and optional axles each comprise a traction relay valve 10, a service-brake actuator 11 on each braked wheel end, a parking brake actuator 12 on the driven axle(s), at least one wheel-speed sensor 14, at least one anti-lock brake modulator 16, and friction brakes, such as an air disc caliper 21, 22 on each braked wheel end. In operation, when a driver presses the brake pedal 95, a dual-circuit foot valve 9 receives pneumatic pressure from a primary reservoir 4 and a secondary reservoir 5 (each having a respective manual drain valve 7). The secondary reservoir 5 provides proportional pneumatic pressure to the braking component of the undriven axle through the foot valve 9, while the primary reservoir 4 provides proportional pneumatic pressure to the braking component of the driven axle and optional axle(s), if present, through the foot valve 9. These proportional supplies of air are controlled by the driver's press on the pedal. In some embodiments, the pressure sensor 6 measures pressure at the control lines from the foot valve 9, while, in other embodiments, a stroke sensor in the foot brake measures driver demand. Accordingly, the braking system of the tractor of this embodiment has two isolated braking circuits one providing braking of the drive axle and optional axle(s) in the rear axle group and another providing braking in the steer axle of front axle group. Either brake circuit can provide braking to the trailer. Other configurations are possible.

The tractor can be used to tow a trailer, which has its own braking system that can also be controlled by the brake pedal 95 of the tractor. (The tractor-trailer combination is sometimes referred to herein as "the vehicle.") The trailer's braking system can take any suitable form, including, but not limited to, a pure pneumatic braking system, an electro-pneumatic braking system signaled with air and/or electronic signals for braking requests, and a regenerative braking system signaled with air and/or electronic signals for braking requests (the regenerative braking system can optionally also provide acceleration). In the embodiment shown in FIG. 1, component 90 provides the greater of the pneumatic pressures from the primary and secondary reservoirs 4, 5 to a tractor protection valve 17. The tractor protection valve 17 provides protected and isolated supply and control air signals to a trailer control coupling 18 and a trailer supply coupling 19. The pneumatic pressure is also supplied to a stop light switch 8 to illuminate a brake light. As mentioned above, this architecture is just an example, and the various components can change as the design changes.

In addition to the pneumatic signals discussed above, the tractor and trailer have controllers that control various braking functions. In one embodiment, the tractor has a primary brake controller 110 and a redundant brake controller 120 (see FIGS. 1 and 2), and the trailer 105 has a trailer brake controller 130 (see FIG. 2). As used herein, a "controller" (which is sometimes referred to herein as an "electronic control unit" (ECU)) can take the form of a (micro-) processor that executes computer-readable program code (e.g., firmware) stored in a computer-readable medium (e.g., in the controller or in another location). A controller can also take the form of a pure-hardware configuration using processing circuitry, logic gates, switches, an application-specific integrated circuit (ASIC), or a programmable logic controller, for example. This configuration will also be referred to as a processor. The firmware and/or hardware of a controller can be configured to perform the various functions described below and shown in the flow diagrams. In one example implementation, one or more of the controllers used herein can take the form of a Global Scalable Brake Control (GSBC). Of course, this is merely one example, and different types of controllers can be used.

Figure 2:
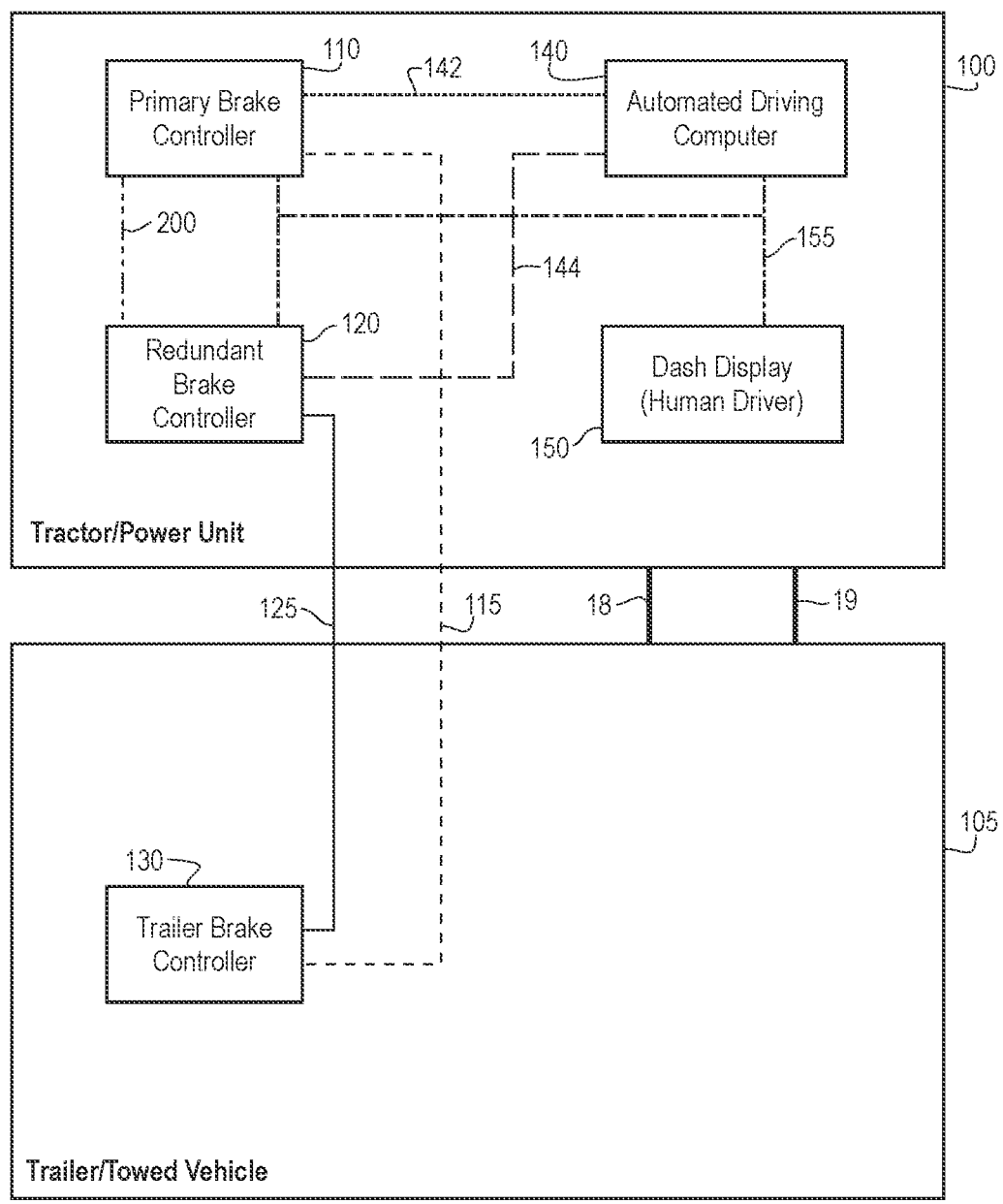
FIG. 2 is a block diagram of a tractor-trailer of an embodiment.

FIG. 2 shows the electronic communication channels used in one embodiment (FIG. 2 also shows the pneumatic control and supply lines 18, 19 discussed above). As shown in FIG. 2, the primary brake controller 110 in the tractor 100 communicates with the trailer brake controller 130 in the trailer 105 via a first communication channel 115, and the redundant brake controller 120 communicates with the trailer brake controller 130 via a second communication channel 125. In one embodiment, the first communication channel 115 takes the form of a controller area network (CAN) data link according to ISO 11992, and the second communication channel 125 takes the form of a power line communication (PLC) cable. Of course, these are merely examples, and different types of communication channels can be used. As also shown in FIG. 2, in this embodiment, the primary and redundant brake controllers 110, 120 communicate with each other via a third communication channel 200 (e.g., a private CAN data link). The primary and redundant brake controllers 110, 120 also communicate with a highly-automated driving (HAD) computer 140 and a dash display 150 (which presents information to a human driver of the tractor 100) via a fourth communication channel 155 (e.g., a J1939 vehicle CAN). The automated driving computer 140 also communicates separate with the primary and redundant brake controllers 110, 120 via fifth and sixth communication channels 142, 144 (e.g., CAN data links), respectively.

With the example communication architecture now described, the following paragraphs describe the operation of the various controllers. The primary brake controller 110 is configured to control various braking and stability systems in the tractor 100, such as, but not limited to, an anti-lock brake system (ABS), an electronic stability system, an automatic traction control system, and a drag torque control system. The primary brake controller 110 can produce and consume signals to/from other processors in the tractor 100 and/or trailer 105. For example, inputs can be provided from sensors including, but are not limited to, the pressure sensor 6, the wheel speed sensors 14, the steer angle sensors 32, the yaw rate sensors 33, and axle sensors. The primary brake controller 110 can also control an endurance brake (not shown), which is capable of causing deceleration by physically limiting the rotational force of the drivetrain's components.

The redundant brake controller 120 is provided as a backup to the primary brake controller 110 and can share at least some of its functions, which will be discussed in detail below. The trailer brake controller 130 can be configured to control various braking functions of the trailer 105 (e.g., to implement an anti-lock braking system (ABS) and/or an electronic stability program (ESP)).

In operation, the tractor 100 provides pneumatic signals for braking the trailer 105 via the pneumatic control and supply lines 18, 19 in response to a human driver pressing the brake pedal 95 or the automated driving computer 140 requesting deceleration. In addition, the primary brake controller 110 in the tractor 100 detects the requested deceleration and provides an electronic signal representing the deceleration request to the trailer brake controller 130 via the first communication channel 115. In this embodiment, the trailer brake controller 130 relies upon the signal from the primary brake controller 110, and the received pneumatic signals are ignored but available as a backup. In this way, the primary brake controller 110 implements an electronic braking system (EBS), which is sometimes referred to as "brake by wire."

EBS offers a number of functionalities not available in non-EBS systems (e.g., those that just provide ABS and/or ESP functionality), such as, but not limited to, coupling force control (controlling and balancing the forces between the tractor 100 and trailer 105 to prevent the trailer 105 from pushing or pulling excessively on the tractor 100), load proportioning (applying different amount of pressure to each wheel end/axle on the vehicle depending on the load of the vehicle), and advanced hill holding (applying a graduated amount of pressure to the brakes to hold the vehicle stationary on a hill while shifting from neutral to a forward gear). In general, EBS provides for more precise, nuanced control of the foundation brakes as compared to ABS.

Also, as compared to a pneumatic signal, an electronic signal used in an EBS system is significantly faster (thus, can reduce braking response time and braking distance) and can provide additional information about the tractor 100 (e.g., from various sensors at each wheel) that can be relevant to the trailer brake controller 130 in braking the trailer 105 (e.g., to assists the trailer's ABS system to ensure driving steerability and stability throughout the whole braking process). Additionally, the trailer's brake controller 130 can provide status and other information back to the primary brake controller 110, which can help inform the primary brake controller about the state of the trailer/towed vehicle.

It is possible for a problem to occur that prevents or limits communication between the primary brake controller 110 and the trailer brake controller 120. For example, the primary brake controller 110 can have a hardware and/or software error, or there can a problem with the first communication channel 115 and/or a communication port in the trailer brake controller 130. Less effective braking can arise when the primary brake controller 110 and the trailer brake controller 130 cannot communicate properly. For example, even though pneumatic braking signals are present even when there is failure in the primary brake controller 110, without have the benefit of information from the primary brake controller 110, the trailer brake controller 130 may not be able to adequately provide ABS and/or ESP functionality.

To address this situation, when there is problem that prevents the primary brake controller 110 and the trailer brake controller 130 from adequately communicating, the redundant brake controller 120 in this embodiment, can take over as the overall or master brake controller from the primary brake controller 110 and communicate with the trailer brake controller 130 via the second communication channel 125. In some embodiments, the redundant brake controller 120 can have fewer input/ports (e.g., enough to communicate with the automated driving computer 140 but not enough to communication with all the various vehicle sensors). The redundant brake controller 120 can also have far less processing power than the primary brake controller 110. For example, the redundant brake controller 120 may just be able to provide basic braking functionality (e.g., ABS and/or ESP) to bring the vehicle to a safe stop at the side of the road and may be more aggressive with braking to provide shorter stopping distances (e.g., electronic interventions tend to be more aggressive because the system cannot finely modulate pressures sent to the wheel ends).

In one embodiment, the redundant brake controller 120 is an ABS-based brake controller, which, while providing braking, ABS, and ESP, does not provide the additional functions described above of an EBS system. So, the redundant brake controller 120 is much less functional than the primary brake controller 110. However, the simpler design of the redundant brake controller 120 reduces possible points of error, potentially making the redundant brake controller 120 more robust than the primary brake controller 110, which is a desirable feature for a redundant component.

Just as the redundant brake controller 120 may be more limited than the primary brake controller 110, the second communication channel 125 can be more limited than the first communication channel 115 (but, in some embodiments, still meeting minimums set by government regulations). For example, as noted above, in one embodiment, the first communication channel 115 can take the form of a controller area network (CAN) data link according to ISO 11992, and the second communication channel 120 takes the form of a power line communication (PLC) interface. A PLC interface is a protocol that exists on top of physical power and ground lines to the trailer. In general, a PLC interface is much more limited than a CAN ISO 11992 data link in terms of speed, amount/type of data that can be conveyed, and robustness. For example, a CAN ISO 11992 data link can support thousands of different message types (e.g., to provide information about the trailer 105, such as the trailer's weigh, number of wheel ends, how many wheel ends are braked, etc.), allow priority arbitration, and provide robustness (e.g., through the use of inverted logic and radio frequency (RF) interference-reduction mechanisms). In contrast, the trailer brake controller 130 can use the PLC interface to communicate with the redundant brake controller 120 by introducing disturbances on the PLC line. The information conveyed on the PLC line 125 can be very basic (e.g., a binary signal that indicates whether there is fault in the trailer's braking system or even just providing a level of awareness that the trailer 105 is connected). In one embodiment, if the redundant brake controller 120 detects a disturbance on the PLC line 125, it can interpret that disturbance as a message from the trailer brake controller 130 that there is fault in the trailer's ABS system. In response, the redundant brake controller 120 can cause a warning indicator to be displayed on the dash display 150 in the tractor 110.

As mentioned above, the redundant brake controller 120 can take over from the primary brake controller 110 as the overall or master brake control unit when there is inadequate communication between the primary brake controller 110 and the trailer brake controller 130 (e.g., caused by partial or total inoperability of the hardware and/or software of the primary brake controller 110, a fault in the first communication channel 110, and/or a problem with a port in the trailer brake controller 130). Any suitable mechanism can be used to detect the problem and trigger the redundant brake controller 120 to take over as the lead brake controller. For example, in one embodiment, the primary brake controller 110 communicates a "heartbeat" signal to the redundant brake controller 120 via the third communication channel 200. If the redundant brake controller 120 does not receive the heartbeat signal when expected (or within a threshold amount of time), it can determine that there is a problem and that it needs to take over.

More specifically, in one embodiment, the primary and redundant brake controllers 110, 120 communicate constantly, sending status messages back and forth, to check each other for functional operation. So, if the redundant brake controller 120 does not receive a status message (or a response to a status message) from the primary brake controller 110, the redundant brake controller 120 can assume there is a problem. The message/response may not have been received, for example, due to a hardware and/or software failure in the primary brake controller 110 and/or due to a problem in sending or receiving communications to the trailer brake controller 130 via the first communication channel 115.

For example, if the primary brake controller 110 suffers a catastrophic hardware failure (e.g., being physically damaged, destroyed, or removed from the tractor 100), the primary brake controller 110 will no longer be able to send messages to the redundant brake controller 120, and the redundant brake controller 120 will detect the failure. If the primary brake controller 110 suffers a moderate hardware failure but retains some level of functionality, it will be able to transmit a failure status to the redundant brake controller 120, and the redundant brake controller 120 can take over as the chief brake controller unit if necessary.

As another example, if the primary brake controller 110 suffers a catastrophic software failure, it will stop transmitting, and the redundant brake controller 120 will detect the failure and take over. If the primary brake controller 110 suffers a moderate software failure but retains some level of functionality, it will be able to transmit a failure status to the redundant brake controller 120, and the redundant brake controller 120 can take over as necessary. Of course, these are merely examples, and other situations can occur.

Figure 3:
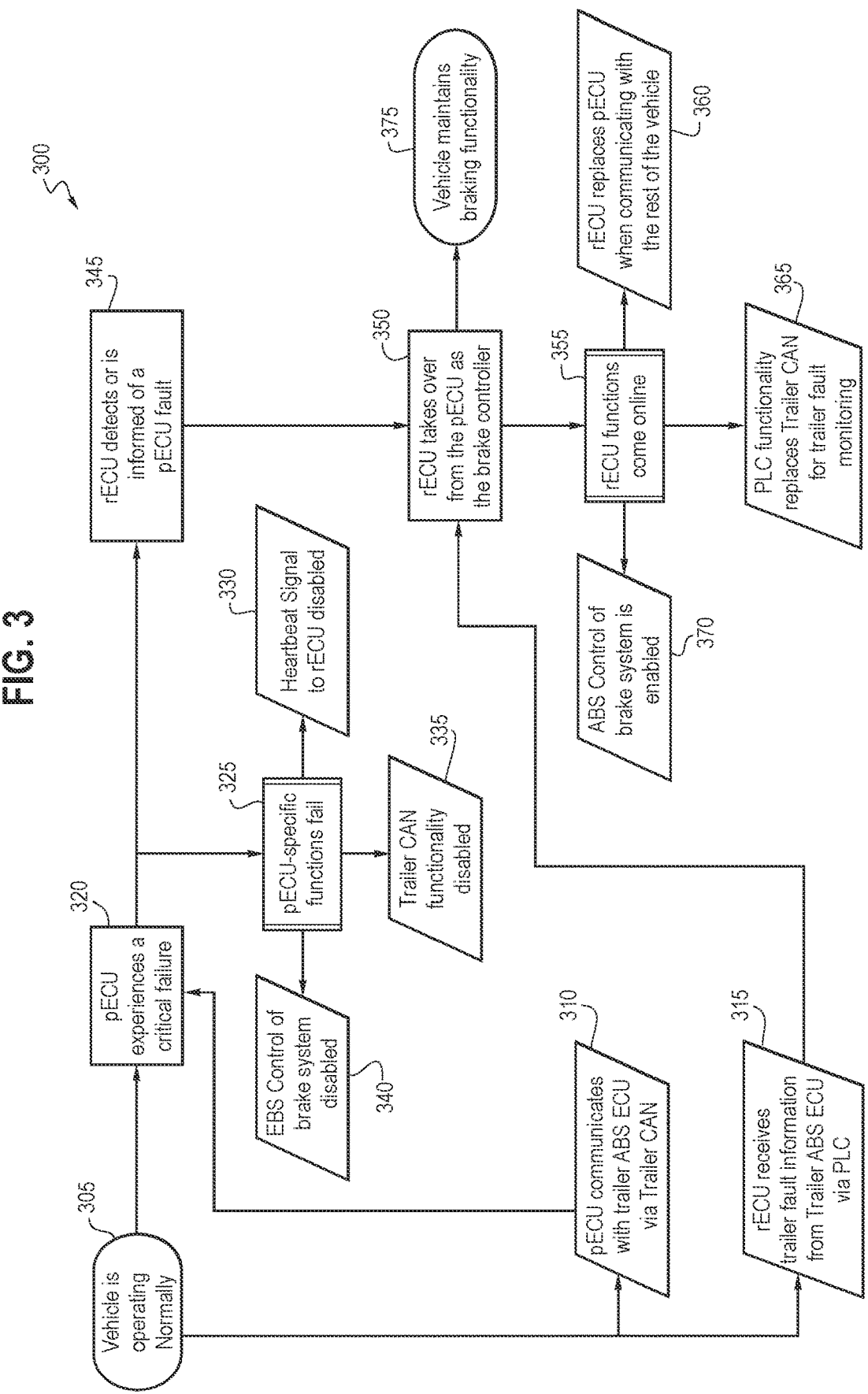
FIG. 3 is a flow chart of a method of an embodiment for detecting a failure of a primary brake controller in a tractor.

Returning to the drawings, FIG. 3 is a flow chart 300 of a method of an embodiment for detecting a failure of the primary brake controller 110. As shown in FIG. 3, in this embodiment, the vehicle starts out functioning normally (act 305). The primary brake controller 110 (here, referred to as the primary electronic control unit (pECU)) communicates with the trailer brake controller (ECU) 130 via the first communications channel 115 (Trailer CAN) (act 310), and the redundant brake controller 120 (here, referred to as the redundant electronic control unit (rECU)) communicates with the trailer brake controller 130 via the second communications channel 125 (PLC) (act 315). As mentioned above, there may be situations in which the primary brake controller 110 experiences a critical failure that prevents it from operating either entirely or below some threshold service level (acts 320 and 325). For example, the primary brake controller 110 may lose its ability to provide a heartbeat signal to the redundant brake controller 120 (act 330), lose its ability to communicate with the trailer brake controller 130 via the first communication channel 115 (act 335), and/or lose its ability to provide EBS control of the brake system (act 340).

In this example, the redundant brake controller 120 detects or is informed of a fault (act 345), and, in response, takes over from the primary brake controller 110 (act 350). When the redundant brake controller 120 takes over, one or more of its functions come online (act 355). For example, the redundant brake controller 120 can replace the primary brake controller 110 when communicating with the rest of the vehicle (act 360), the second communication channel 125 can replace the first communication channel 115 for trailer fault monitoring (act 365), and/or the redundant brake controller 120 can enable ABS control (act 370). In this way, the redundant brake controller 120 ensures that the vehicle maintains sufficient braking functionality (act 375).

As noted above, a problem with the first communication channel 115 can also be detected and trigger the redundant brake controller 120 taking over. In one embodiment, information is transmitted constantly over the first communication channel 115 between the primary brake controller 110 and the trailer brake controller 130. If this link fails, the primary brake controller 110 can notice and notify the redundant brake controller 120 of the link failure. The redundant brake controller 120 can also monitor the fault information coming from the trailer brake controller 130. These actions are described in more detail in the flow chart 400 of FIG. 4.

As shown in FIG. 4, the vehicle starts out operating normally (act 405). The primary brake controller 110 communicates with the trailer brake controller 130 via the first communications channel 115 (act 410), and the redundant brake controller 120 communicates with the trailer brake controller 130 via the second communications channel 125 (act 415). If the primary brake controller 110 is functioning normally, the primary brake controller 110 can detect if the first communication channel 115 is experiencing a fault (e.g., a physical failure of hardware and/or a software failure) (act 420) and notify the redundant brake controller 120 of the failure via the third communication channel 200 (act 425). The redundant brake controller 120 can also receive a fault notification from the trailer brake system 130 via the second communication channel 125 (act 430). In response, the redundant brake controller 120 retransmits the trailer fault status to other components of the tractor 100 via the vehicle CAN J1939 (the fourth communication channel 155) (act 435). This allows the vehicle to maintain awareness of the trailer status (act 440).

Irrespective of what the trigger is, when the redundant brake controller 120 takes over, it can notify components of the system that the system's brake controller is operating in a reduced-functionality mode (these components may not realize that a different controller is in charge). For example, the redundant brake controller 120 can notify the automated driving computer 140 of the failure (and any reduced functionalities) and act as the primary, singular brake controller to the rest of the system. Once the functionality of the primary brake controller 110 is restored, the primary brake controller 110 can take control back over from the redundant brake controller 120.

There are several advantages associated with these embodiments. For example, these embodiments can be used to increase redundancy for tractor/trailer communications without expanding the complexity or hardware requirements of the system. As another example, these embodiments can be used to support a lower level of functionality in redundant mode while still meeting legal requirements and provide a much higher level of functionality in primary mode than is offered with current systems. Additionally, these embodiments can be particularly advantages in autonomous tractor-trailer communications (e.g., on a Level 4 (L4) redundant, highly-automated driving (HAD) commercial vehicle, where driving is mostly autonomous with the human driver taking over only in some situations). More specifically, these embodiments can support the HAD computer 140 if the primary brake controller 110 fails by allowing the redundant brake controller 120 to provide a backup computer-controlled interface to operate the brakes by providing information about the trailer 105 to the HAD computer 140 (and the driver) in the event of a failure in the primary brake controller 110 and/or first communication channel 115. Even if the information available over the second communication channel 125 is vastly less full-featured as compared to the information available over the first communication interface 115, the information can be sufficient for the redundant brake controller 120 to maintain awareness about the trailer 105 and inform the system of any failures, which makes the vehicle system more robust against failures.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A braking control system for a tractor-trailer, the braking control system comprising:
 a primary brake controller in a tractor configured to communicate with a trailer brake controller in a trailer via a first communication channel; and
 a redundant brake controller in the tractor configured to communicate with the trailer brake controller via a second communication channel, wherein the second communication channel is of a different type than the first communication channel;

wherein the primary brake controller is further configured to serve as a master brake controller for the tractor and trailer and communicate with an automated driving computer in the tractor; and wherein the redundant brake controller is further configured to take over as the master brake controller in response to determining that the primary brake controller can no longer serve as the master brake controller.

2. The braking control system of claim 1, wherein the redundant brake controller is further configured to determine that the primary brake controller can no longer serve as the master brake controller in response to failing to receive a heartbeat signal from the primary brake controller.

3. The braking control system of claim 1, wherein the redundant brake controller is further configured to determine that the primary brake controller can no longer serve as the master brake controller in response to receiving a message from the primary brake controller indicating that an error exists in the first communication channel.

4. The braking control system of claim 1, wherein the redundant brake controller is further configured to determine that the primary brake controller can no longer serve as the master brake controller in response to receiving an error message from the primary brake controller.

5. The braking control system of claim 1, wherein the primary brake controller is further configured to take back over as the master brake controller in response to resolution of a problem that caused the redundant brake controller to take over.

6. The braking control system of claim 1, wherein the first communication channel comprises a controller area network (CAN) data link.

7. The braking control system of claim 1, wherein the second communication channel comprises a power line communication (PLC) interface.

8. The braking control system of claim 1, wherein the primary brake controller comprises an electronic braking system (EBS) architecture, and wherein the redundant brake controller comprises an anti-lock brake system (ABS) architecture.

9. The braking control system of claim 1, wherein the primary brake controller comprises a greater number of ports that the redundant brake controller.

10. The braking control system of claim 1, wherein the primary brake controller has greater processing power than the redundant brake controller.

11. The braking control system of claim 1, wherein the second communication channel is of a different type than the first communication channel in that the second communication channel is more limited than the first communication channel in terms of speed, amount and/or type of data that can be conveyed, and/or robustness.

12. A braking control system for a tractor-trailer, the braking control system comprising:
a primary electronic controller in a tractor, wherein the primary electronic controller comprises an electronic braking system (EBS) controller configured to communicate with a trailer brake controller in a trailer via a controller area network data link; and
a redundant electronic controller in the tractor, wherein the redundant electronic controller comprises an anti-lock brake system (ABS) controller configured to communicate with the trailer brake controller via a power line communication interface;
wherein the redundant electronic controller is further configured to take over from the primary electronic controller as a braking controller for the trailer in response to a problem.

13. The braking control system of claim 12, further comprising an automated driving computer in communication with the primary and redundant electronic controllers.

14. The braking control system of claim 12, wherein the problem is indicated by a failure to receive a heartbeat signal from the primary electronic controller.

15. The braking control system of claim 12, wherein the problem is indicated by receipt of a message from the primary electronic controller indicating that a fault has occurred.

16. The braking control system of claim 12, wherein the redundant electronic controller is further configured to receive fault information from the trailer brake controller via the power line communication interface.

17. A method comprising:
performing the following in a second brake controller in a towing vehicle:
receiving heartbeat signals from a first brake controller in the towing vehicle, wherein the first brake controller in the towing vehicle is a master brake controller to a brake controller in a towed vehicle;
detecting a missing heartbeat signal from the first brake controller; and
in response to detecting the missing heartbeat signal, taking over as the master brake controller;
wherein:
the first brake controller in the towing vehicle is configured to communicate with the brake controller in the towed vehicle via a first communication channel; and
the second brake controller in the towing vehicle is configured to communicate with the brake controller in the towed vehicle via a second communication channel, wherein the second communication channel is of a different type than the first communication channel.

18. The method of claim 17, wherein taking over as the master brake controller comprises replacing the first brake controller when communicating with the towed vehicle.

19. The method of claim 17, wherein taking over as the master brake controller comprises replacing the first brake controller as a recipient of fault messages from the brake controller in the towed vehicle.

20. The method of claim 17, wherein taking over as the master brake controller comprises enabling an anti-lock braking system.

* * * * *